(12) United States Patent
Ma et al.

(10) Patent No.: US 11,087,166 B2
(45) Date of Patent: Aug. 10, 2021

(54) TRAINING METHOD OF IMAGE-TEXT MATCHING MODEL, BI-DIRECTIONAL SEARCH METHOD, AND RELEVANT APPARATUS

(71) Applicant: TENCENT TECHNOLOGY (SHENZHEN) COMPANY LIMITED, Shenzhen (CN)

(72) Inventors: Lin Ma, Shenzhen (CN); Wenhao Jiang, Shenzhen (CN); Wei Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 71 days.

(21) Appl. No.: 16/579,411

(22) Filed: Sep. 23, 2019

(65) Prior Publication Data

US 2020/0019807 A1 Jan. 16, 2020

Related U.S. Application Data

(63) Continuation of application No. PCT/CN2018/104565, filed on Sep. 7, 2018.

(30) Foreign Application Priority Data

Sep. 12, 2017 (CN) .......................... 201710817344.5

(51) Int. Cl.
*G06K 9/46* (2006.01)
*G06K 9/62* (2006.01)

(52) U.S. Cl.
CPC ......... *G06K 9/4609* (2013.01); *G06K 9/4652* (2013.01); *G06K 9/6256* (2013.01); *G06K 2209/01* (2013.01)

(58) Field of Classification Search
CPC ............... G06K 9/4609; G06K 9/4652; G06K 9/6256; G06K 2209/01; G06K 9/00456;
(Continued)

(56) References Cited

U.S. PATENT DOCUMENTS 5,491,758 A * 2/1996 Bellegarda ........... G06K 9/6293
382/187
9,177,225 B1 * 11/2015 Cordova-Diba ... G06K 9/00671
(Continued)

FOREIGN PATENT DOCUMENTS

CN 102012939 A 4/2011
CN 102629275 A 8/2012
(Continued)

OTHER PUBLICATIONS

The State Intellectual Property Office of the People's Republic of China (SIPO) Office Action 2 for 201710817344.5 dated Apr. 21, 2020 10 Pages (including translation).
(Continued)

*Primary Examiner* — Ali Bayat
(74) *Attorney, Agent, or Firm* — Anova Law Group, PLLC

(57) ABSTRACT

This application relates to the field of artificial intelligence technologies, and in particular, to a training method of an image-text matching model, a bi-directional search method, and a relevant apparatus. The training method includes extracting a global feature and a local feature of an image sample; extracting a global feature and a local feature of a text sample; training a matching model according to the extracted global feature and local feature of the image sample and the extracted global feature and local feature of the text sample, to determine model parameters of the matching model; and determining, by the matching model, according to a global feature and a local feature of an
(Continued)

inputted image and a global feature and a local feature of an inputted text, a matching degree between the image and the text.

18 Claims, 9 Drawing Sheets

(58) Field of Classification Search
CPC .. G06K 9/6274; G06K 9/4628; G06K 9/6214; G06K 9/6215; G06N 3/0454
USPC .......................................................... 382/103
See application file for complete search history.

(56) References Cited

U.S. PATENT DOCUMENTS

| | | | |
|---|---|---|---|
| 9,501,724 | B1 | 11/2016 | Yang et al. |
| 2013/0044944 | A1* | 2/2013 | Wang ................. G06F 16/5838 382/165 |
| 2013/0108115 | A1 | 5/2013 | Hwang et al. |
| 2018/0300358 | A1* | 10/2018 | Chen ...................... G06F 16/00 |
| 2019/0057270 | A1* | 2/2019 | Heo ......................... G06F 21/83 |
| 2019/0205433 | A1* | 7/2019 | Lo .......................... G06F 16/532 |

FOREIGN PATENT DOCUMENTS

| | | |
|---|---|---|
| CN | 103353875 A | 10/2013 |
| CN | 104036277 A | 9/2014 |
| CN | 104199826 A | 12/2014 |
| CN | 104376105 A | 2/2015 |
| CN | 104834747 A | 8/2015 |
| CN | 106095829 A | 11/2016 |
| CN | 107330100 A | 11/2017 |
| CN | 108288067 A | 7/2018 |
| JP | 2011221794 A | 11/2011 |
| KR | 1020140059834 A | 5/2014 |

OTHER PUBLICATIONS

The World Intellectual Property Organization (WIPO) International Search Report for PCT/CN2018/104565 dated Dec. 10, 2018 6 Pages (including translation).

M. Hodosh et al., "Framing Image Description as a Ranking Task: Data, Models and Evaluation Metrics", Journal of Artificial Intelligence Research, 47:853-899, 2013 47 Pages.

R. Socher et al., "Grounded Compositional Semantics for Finding and Describing Images with Sentences Mapping", Transactions of the Association for Computational Linguistics, 2:207-218, 2014 12 Pages.

A. Karpathy et al., "Deep Fragment Embeddings for Bidirectional Image Sentence Mapping", NIPS, 2014 9 Pages.

The State Intellectual Property Office of the People's Republic of China (SIPO) Office Action 1 for 201710817344.5 dated Dec. 17, 2019 12 Pages (including translation).

Nikhil Rasiwasia et al., "A new approach to cross-modal multimedia retrieval", Proceedings of the 18th ACM International conference on Multimedia, Oct. 29, 2010 (Oct. 29, 2010), pp. 251-260 10 Pages.

Hui Zhou, "A Cross-Modal Multimedia Retrieval Method Research Based on Deep Learning and Centered Correlation", "Chinese Master's Theses Full-text Database, Information Science and Technology", Feb. 15, 2017 (Feb. 15, 2017), The entire passage 59 Pages.

Korean Intellectual Property Office (KIPO) Office Action 1 for 20197030955 dated Sep. 24, 2020 12 Pages (including translation).

The European Patent Office (EPO) The Partial Supplementary European Search Report for 18857317.4 dated Oct. 1, 2020 19 Pages.

The European Patent Office (EPO) The Extended European Search Report for 18857317.4 dated Jan. 20, 2021 15 Pages.

Jianhao Wang et al., "Image-Sentence Multimodal Embedding with Instructive Objectives," Advances in Neural Information Processing Systems 29: 30th Annual Conference on Neural Information Processing Systems 2016: Barcelona, Spain, Dec. 5-10, 2016, Dec. 10, 2016 (Dec. 10, 2016), pp. 1-8. 8 pages.

Andrej Karpathy et al., "Deep Fragment Embeddings for Bidirectional Image Sentence Mapping," Jun. 22, 2014 (Jun. 22, 2014), pp. 1-9, Retrieved from the Internet: URL: http://arxiv.org/pdf/1406.5679v1.pdf [retrieved on Feb. 1, 2016]. 9 pages.

Lin Ma et al., "Multimodal Convolutional Neural Networks for Matching Image and Sentence," 2015 IEEE International Conference on Computer Vision (ICCV), IEEE, Dec. 7, 2015 (Dec. 7, 2015), pp. 2623-2631. 9 pages.

Yunchao Gong et al., "Deep Convolutional Ranking for Multilabel Image Annotation," Dec. 17, 2013 (Dec. 17, 2013), Retrieved from the Internet: URL: https://arxiv.org/pdf/1312.4894.pdf [retrieved on Dec. 14, 2016]. 9 pages.

* cited by examiner

TRAINING METHOD OF IMAGE-TEXT MATCHING MODEL, BI-DIRECTIONAL SEARCH METHOD, AND RELEVANT APPARATUS

RELATED APPLICATION

This application claims priority to PCT Application No. PCT/CN2018/104565, filed on Sep. 7, 2018, which in turn claims priority to Chinese Patent Application No. 201710817344.5, entitled "TRAINING METHOD OF IMAGE-TEXT MATCHING MODEL, BI-DIRECTIONAL SEARCH METHOD, AND RELEVANT APPARATUS," filed with the Chinese Patent Office on Sep. 12, 2017. The two applications are incorporated by reference in their entirety.

FIELD OF THE TECHNOLOGY

This application relates to the field of artificial intelligence technologies, and in particular, to a training method of an image-text matching model, a bi-directional search method, and a relevant apparatus.

BACKGROUND OF THE DISCLOSURE

Understanding of images and texts has always been one of the most important research directions in artificial intelligence. One important research is exploring relationships between images and texts. For example, news text content and a news image in web page news may express a same theme. That is, images and texts do not exist absolutely independently, and there are relationships between the images and the texts. Therefore, how to find a text matching a given image or find an image matching a given text becomes a topic of interest in the industry.

SUMMARY

Embodiments of this application provide a training method of an image-text matching model and a relevant apparatus, so that a matching degree between an image and a text can be comprehensively measured, and the obtained matching degree is more accurate and comprehensive.

The embodiments of this application provide a bi-directional search method and a relevant apparatus, so that when an image-text bi-directional search is performed, a more accurate search result can be obtained.

The embodiments of this application provide a training method of an image-text matching model, the method being performed by a computer and including: The training method includes extracting a global feature and a local feature of an image sample; extracting a global feature and a local feature of a text sample; training a matching model according to the extracted global feature and local feature of the image sample and the extracted global feature and local feature of the text sample, to determine model parameters of the matching model; and determining, by the matching model, according to a global feature and a local feature of an inputted image and a global feature and a local feature of an inputted text, a matching degree between the image and the text.

The embodiments of this application provide an image-text bi-directional search method, the method being performed by a computer and including: receiving a reference sample, the reference sample being a text or an image; extracting a global feature and a local feature of the reference sample; inputting the global feature and the local feature of the reference sample into a matching model, to enable the matching model to calculate a matching degree between the reference sample and a corresponding material. The corresponding material is an image when the reference sample is a text; the corresponding material is a text when the reference sample is an image. The matching model is capable of determining a matching degree between the reference sample and the corresponding material based on the global feature and the local feature of the reference sample and a global feature and a local feature of the corresponding material. The method further includes selecting a corresponding material whose matching degree is greater than a specified matching degree as a material matching the reference sample.

The embodiments of this application provide a computer readable medium containing program instructions for training an image-text matching model. Execution of the program instructions by one or more processors of a computer system causes the one or more processors to perform the steps of: extracting a global feature and a local feature of an image sample; extracting a global feature and a local feature of a text sample; training a matching model according to the extracted global feature and local feature of the image sample and the extracted global feature and local feature of the text sample; and determining model parameters of the matching model, the matching model being used to determine, according to a global feature and a local feature of an image and a global feature and a local feature of a text, a matching degree between the image and the text.

The embodiments of this application provide a computing device, including a memory and a processor, the memory being configured to store program instructions, and the processor being configured to invoke the program instructions stored in the memory, and perform the image-text bi-directional search method according to the embodiments of this application according to the obtained program instructions. The embodiments of this application provide a computer storage medium, the computer storage medium storing computer-executable instructions, the computer-executable instructions being used to enable the computer to perform the image-text bi-directional search method according to the embodiments of this application according to the computer-executable instructions.

DESCRIPTION OF EMBODIMENTS

Figure 1:
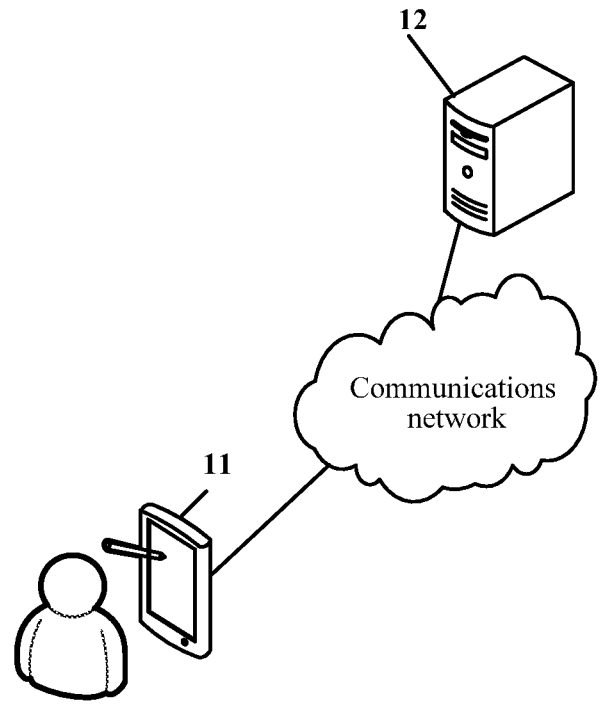
FIG. 1 is a schematic diagram of an application scenario according to some embodiments of this application.

For ease of understanding the technical solution provided by the embodiments of this application, the embodiments of this application are described below in detail with reference to the accompanying drawings of the specification.

In some embodiments, matching between an image and a text is implemented through two methods.

Method 1: Extract respective global representations of an image and a text, map the global representations to a same semantic space, and establish a matching relationship between the global representations of the image and the text in the semantic space, so as to establish a matching relationship between the image and the text. The global representations reflect global characteristics of the image, and are used to describe overall features of the image, and the global representations are, for example, a color feature, a shape feature, a texture feature, and the like.

Method 2: Obtain a local representation of local information of an image through a convolutional neural network, and obtain local representation of a text through syntax tree information, so as to learn a matching relationship between local representations of the image and the text. The local representation reflects local information of the image, and is used to describe local detailed features of the image. Compared with the global representation, the local representation are characterized by a large quantity in an image, a small relevance between features, and detection and matching of other features would not be affected by disappearance of some local features in an obscured situation.

However, in the foregoing two methods, matching between an image and a text is performed by using information in a single aspect, that is, either independently using a global representation or independently using a local representation. Regardless of performing matching between an image and a text by using a local representation or a global representation, a matching degree between the image and the text can only be reflected on one level. For an image with rich content, for the global representation, only color features, shape features, and texture features can be extracted, but the detailed features of the local representation cannot be represented. Consequently, the features that can be reflected are limited. However, for the local representation, a matching relationship between an image and a text can only be considered locally, and a feature of the global representation cannot be reflected. Therefore, neither of the foregoing methods can comprehensively measure a matching degree between an image and a text.

To comprehensively match an image and a text and obtain a more accurate matching degree, in this embodiment of this application, an image-text matching model is trained according to the following method, specifically including: extracting a global feature and a local feature of an image sample; extracting a global feature and a local feature of a text sample; and training a matching model according to the extracted global feature and local feature of the image sample and the extracted global feature and local feature of the text sample, to determine model parameters of the matching model, the matching model being used to determine, according to a global feature and a local feature of an image and a global feature and a local feature of a text, a matching degree between the image and the text.

In this way, the obtained matching degree is based on the respective global representations and local representations of the image and the text. From detailed features to the global feature of the image are all considered, and the obtained matching degree is more accurate and comprehensive. Therefore, when an image-text bi-directional search is performed based on the matching model provided by this embodiment of this application, a search result is also more accurate.

For example, referring to FIG. 1, FIG. 1 is a schematic diagram of an application scenario according to an embodiment of this application. The scenario, for example, may include a terminal device 11 and a server 12. Various clients, such as a blog client for social communication, WeChat client, and a news client for learning current events, may be installed in the terminal device 11. After a client of the terminal device 11 and the server 12 establish a communication connection, the client of the terminal device 11 may extract global features and local features of or a global feature and a local feature of the image and/or the text and transmit them to the server 12. Alternatively, the client of the terminal device 11 transmits the image and/or text to the server 12, and the server 12 extracts global features and local features of or a global feature and a local feature of the image and/or the text. Then, the server 12 searches for a text matching the image according to the global feature and the local feature of the image based on the matching model, or the server 12 searches for an image matching the text according to the global feature and the local feature of the text based on the matching model. Subsequently, the server 12 feeds back a search result to the terminal device 11.

The terminal device 11 and the server 12 may be communicably connected through a communications network. The network may be a local area network, a wide area network, or the like. The terminal device 11 may be a mobile phone, a tablet computer, a notebook computer, a personal computer, or the like. The server 12 may be any server device capable of supporting training of a corresponding image-text matching model and a bi-directional search.

The solution provided by this embodiment of this application is applicable to any scenario that needs to search for an image according to a text and/or needs to search for a text according to an image. For example, the solution may be applicable to searching for an image and/or a text in cloud album management (for example, searching for a matching image according to a given text), WeChat Moments, QQ Space, QQ Mass Innovation Space, and chat environments of WeChat and QQ.

Figure 2A:
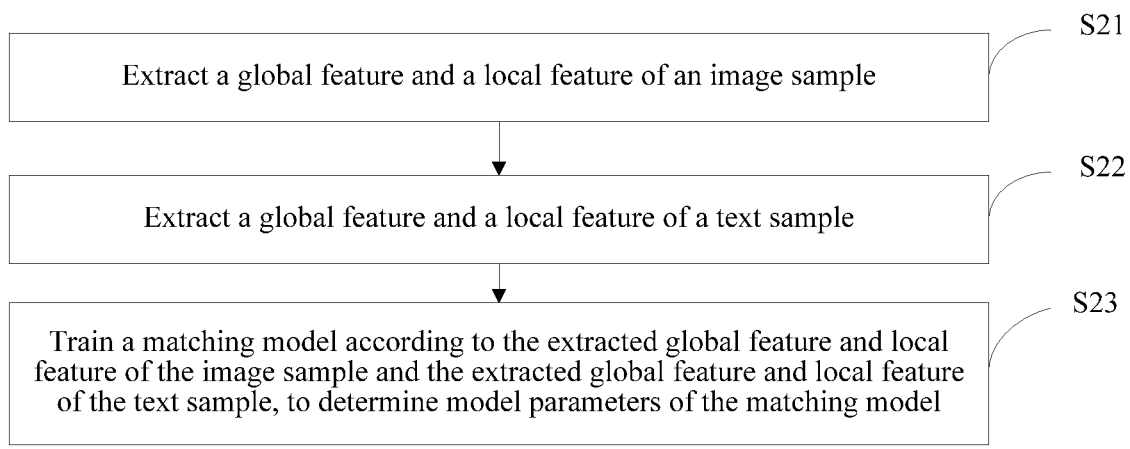
FIG. 2A is a schematic flowchart of a training method of an image-text matching model according to some embodiments of this application.

Referring to FIG. 2A, which is a schematic flowchart of a training method of an image-text matching model according to an embodiment of this application. The method is performed by a computer, and the computer may be a server 12, including following steps:

S21: Extract a global feature and a local feature of an image sample.

S22: Extract a global feature and a local feature of a text sample.

S23: Train a matching model according to the extracted global feature and local feature of the image sample and the extracted global feature and local feature of the text sample, to determine model parameters of the matching model, the matching model being used to determine, according to a global feature and a local feature of an image and a global feature and a local feature of a text, a matching degree between the image and the text.

When this technical solution provided by this application is used, the matching model is trained according to the global features and the local features of the image sample and the text sample, from the local features to the global feature of the image and the text are all considered, and a matching degree determined according to the trained matching model is more accurate and comprehensive. When an image-text bi-directional search is performed based on the matching model provided by this embodiment of this application, a search result is more accurate.

Figure 2B:
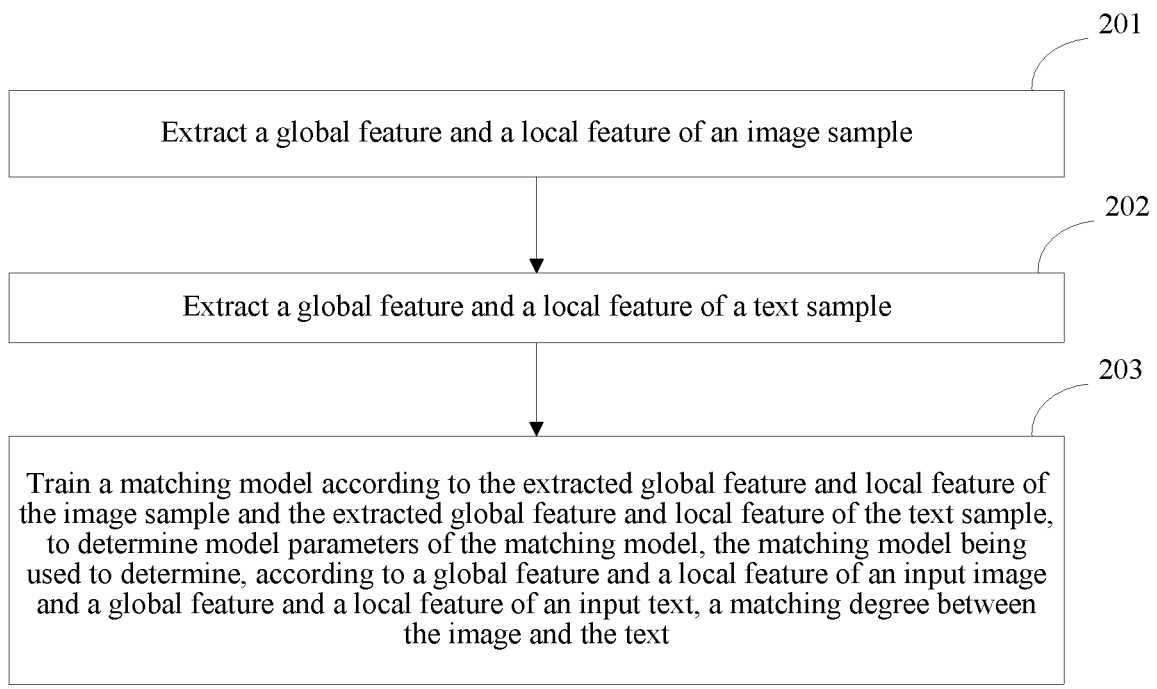
FIG. 2B is a schematic flowchart of a training method of an image-text matching model according to some embodiments of this application.

Referring to FIG. 2B, which is a flowchart of a training method of an image-text matching model according to an embodiment of this application, the method may be performed by the server 12 shown in FIG. 1, and includes the following steps.

Step 201: Extract a global feature and a local feature of an image sample.

In some embodiments, the global feature is a vector, used to represent text information of a corresponding image. The local feature of the image sample is also a vector, and information of each dimension of the vector represents that a local area of the image includes information of a corresponding word category, for example, a probability that a local area of the image includes information of a corresponding word category.

Step 202: Extract a global feature and a local feature of a text sample.

In some embodiments, the global feature of the text sample is used to represent overall semantic information of the text sample. The local feature of the text sample is used to represent integration of local semantic information of the text. The local feature of the text sample focuses on local information, such as a word or a phrase, of the text.

The execution sequence of step 201 and step 202 is not limited to the description above.

Step 203: Train a matching model according to the extracted global feature and local feature of the image sample and the extracted global feature and local feature of the text sample, to determine model parameters of the matching model, the matching model being used to determine, according to a global feature and a local feature of an inputted image and a global feature and a local feature of an inputted text, a matching degree between the image and the text.

Next, after the matching model is completely trained, the matching degree between the image and the text may alternatively be determined according to the trained matching model, including the following steps.

Step 204: Map the respective global features of the image and the text through the matching model into a specified semantic space, to calculate a similarity between the global features of the image and the text, map the respective local features of the image and the text into the specified semantic space, to calculate a similarity between the local features of the image and the text, and determine the matching degree between the image and the text in a weighted summation manner according to a preset weight of the similarity between the global features and a preset weight of the similarity between the local features.

Figure 3:
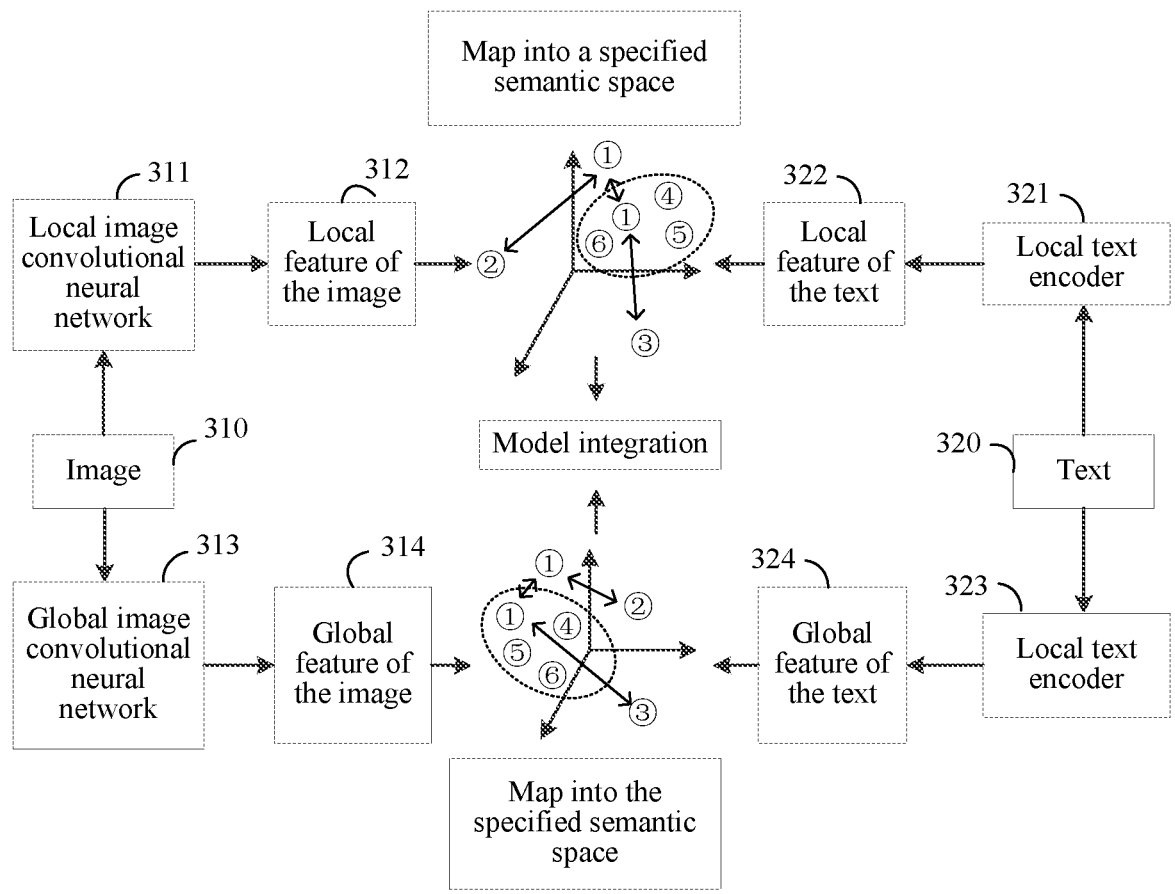
FIG. 3 is a block diagram of a matching model according to some embodiments of this application.

As shown in FIG. 3, which is a block diagram of an image-text matching model according to an embodiment of this application, in FIG. 3, for an inputted image 310, an local image convolutional neural network (CNN) 311 is used to extract a local representation (which is also referred to as a local feature) of the image (as shown by 312 in the figure), and a global image CNN 313 is used to extract a global representation (which is also referred to as a global feature) of the image (as shown by 314 in the figure). For an inputted text 320, a local text encoder 321 is used to extract a local representation (which is also referred to as a local feature) of the text (as shown by 322 in the figure), and a global text encoder 323 is used to extract a global representation (which is also referred to as a global feature) of the text (as shown by 324 in the figure). After the local representations and the global representations of the image 310 and the text 320 are extracted, the respective local representations of the image 310 and the text 320 are mapped to a specified semantic space through local depth matching, and a similarity between local features of a heterogeneous sample pair (which is also referred to as an image-text pair) constituted by the image 310 and the text 320 is determined in the specified semantic space. Similarly, the respective global features of the image 310 and the text 320 are mapped into the specified semantic space through global depth matching, and a similarity between global features of the heterogeneous sample pair constituted by the image 310 and the text 320 is determined in the specified semantic space. Subsequently, a matching degree of the heterogeneous sample pair is determined in a weighted summation manner through model integration according to a preset weight of the similarity between the global features and a preset weight of the similarity between the local features.

For ease of understanding, this embodiment of this application provides a training method of an image-text matching model, which is described by using the following content.

1) With regard to mapping into a specified semantic space.

In some embodiments, to accurately obtain the similarity between the global representations and the similarity between the local representations of the image and text, the mapping the respective global representations of the image sample and the text sample are mapped into the specified semantic space specifically includes: respectively mapping the respective global features of the image sample and the text sample through at least two fully connected layers into the specified semantic space.

The mapping the respective local representations of the image sample and the text sample are mapped into the specified semantic space specifically includes: respectively mapping the respective local features of the image sample and the text sample through the at least two fully connected layers into the specified semantic space.

The fully connected layer is a layer in a basic structure of the convolutional neural network. Each node of the fully connected layer is connected to all nodes of a previous layer and is configured to integrate the previous extracted features. The fully connected layer is configured to map the global features and the local features of the image and the text into the specified semantic space. A full connection operation means an operation of mapping into a specified semantic space through a fully connected layer. A parameter of the fully connected layer is obtained through training according to a preset target function. The preset target function is used to implement that a similarity of a semantically associated heterogeneous sample pair (image-text pair) is higher than a similarity of a non-semantically associated heterogeneous sample pair. Alternatively, the preset target function is used to implement that a similarity of a semantically associated heterogeneous sample pair is higher than a similarity of a non-semantically associated heterogeneous sample pair, and that a similarity between text samples associated with a same image sample is higher than a similarity between text samples associated with different image samples.

In this embodiment of this application, the respective global representations and local representations of the text and the image are accurately analyzed through a plurality of fully connected layers, so as to map the global representations and the local representations of the text and the image into a same semantic space. In addition, parameters of the fully connected layers are determined according to the preset target function. A similarity (the similarity is a similarity of global representations or a similarity of local representations) of a heterogeneous image-text pair can be accurately determined through the preset target function according to an actual situation.

In addition, multi-layer non-linear transformation may be performed on descriptions of the text and the image through the plurality of fully connected layers, so as to explore a direct matching relationship between the image and the text.

If the preset target function is used to realize that a similarity of a semantically associated heterogeneous sample pair is higher than a similarity of a non-semantically associated heterogeneous sample pair, the preset target function may be shown in formula (1):

$$L(I_n^+, S_n^+, I_n^-, S_n^-) = \lambda_1 \max(0, u_1 + d(I_n^+, S_n^+) - d(I_n^+, S_n^-)) + \lambda_2 \max(0, u_2 + d(I_n^+, S_n^+) - d(I_n^-, S_n^+))$$ (1)

where $L(I_n^+, S_n^+, I_n^-, S_n^-)$ represents a preset target function; $I_n^+$ and $I_n^-$ represent a text sample; $S_n^+$ and $S_n^-$ represent an image sample; in a case that a similarity between global representations is determined, d( ) represents a similarity between global representations of the text sample and the image sample; in a case that a similarity between local representations is determined, d( ) represents a similarity between local representations of the text sample and the image sample; $\lambda_1$ and $\lambda_2$ both represent preset coefficients; $d(I_n^+, S_n^+)$ represents a similarity of a semantically associated heterogeneous pair; $d(I_n^+, S_n^-)$ and $d(I_n^-, S_n^+)$ both represent a similarity of a non-semantically associated heterogeneous pair; and $\mu_1$ and $\mu_2$ both represent preset thresholds.

It is considered that one image is generally semantically associated with a plurality of samples. For example, in a landscape image where a bird flies in the sky and a fish swims in the water, corresponding semantic information may include that a bird flies in the sky and a fish swims in the water. Therefore, to improve accuracy of a matching model, it is necessary to make a similarity between texts semantically associated with a same image higher than a similarity between the texts and texts semantically associated with other images. On the basis of satisfying the condition as described in formula (1), the preset target function needs to also require that a similarity between text samples associated with a same image sample is higher than a similarity between text samples associated with different image samples. To reach the objective, a formula for making a similarity between text samples associated with a same image sample higher than a similarity between text samples associated with different image samples is shown as formula (2):

$$L(S_i, S_l, S_j) = \max(0, u_3 + d(S_i, S_l) - d(S_i, S_j))$$ (2)

where $L(S_i, S_l, S_j)$ represents a preset target function that requires that a similarity between text samples associated with a same image sample is higher than a similarity between text samples associated with different image samples; $S_i$, $S_l$ represent text samples semantically associated with a same image sample; $S_i$, $S_j$ represent text samples associated with different image samples; in a case that a similarity between global representations is determined, d( ) represents a similarity between global representations of the text samples; in a case that a similarity between local representations is determined, d( ) represents a similarity between local representations of the text samples; and $u_3$ represents a preset threshold.

In some embodiments, the formula (1) and the formula (2) may be integrated, to obtain a preset target function in a form as described in the formula (3) or the formula (4), and the obtained preset target function can satisfy requirements as described in the formula (1) and the formula (2):

$$LY = L(I_n^+, S_n^+, I_n^-, S_n^-) + L(S_i, S_l, S_j)$$ (3); and $$LY = L(I_n^+, S_n^+, I_n^-, S_n^-) * L(S_i, S_l, S_j)$$ (4).

During a specific implementation, a specific mathematical expression manner may be designed according to requirements of the preset objective function. This not limited in this embodiment of this application.

Figure 4:
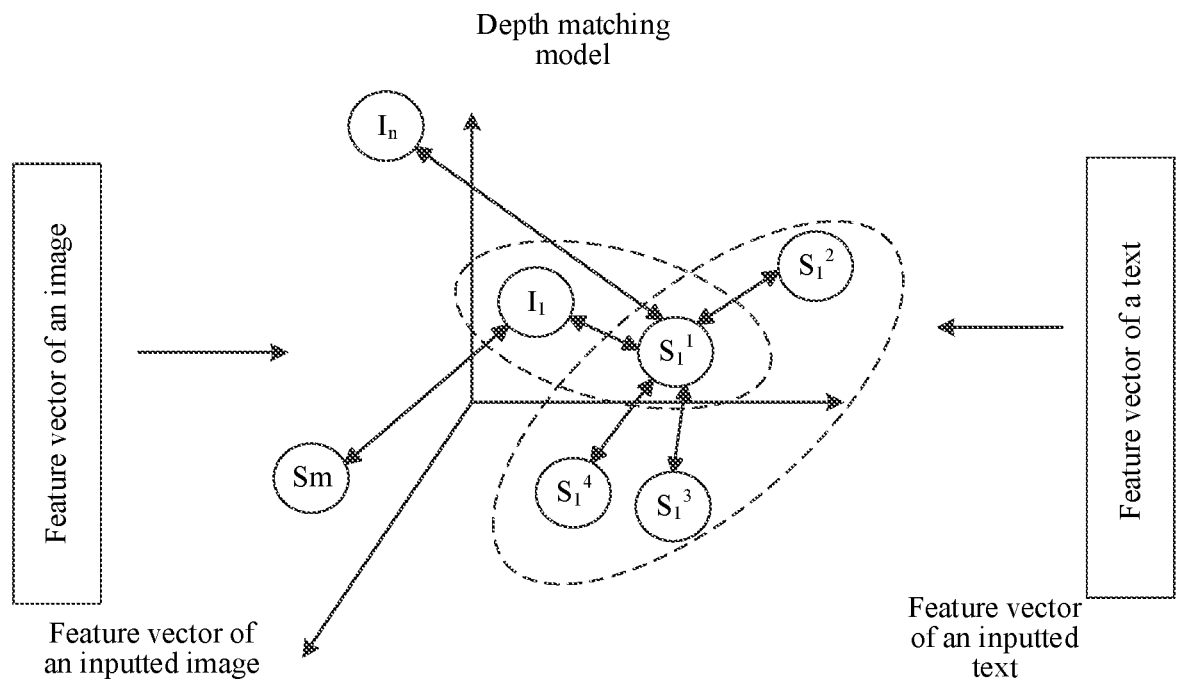
FIG. 4 is a block diagram of calculating a similarity of an image feature according to some embodiments of this application.

According to an effect of the preset target function, a depth matching model as shown in FIG. 4 may be trained. The depth matching model is used to determine a matching degree between an image and a text. In FIG. 4, a feature vector (image embedding) of an image (the feature vector is a feature vector of a global feature or a local feature) is inputted on a left side, and a feature vector (sentence embedding) of a text (the feature vector is a feature vector of a global feature or a feature vector of a local feature) is inputted on a right side. After the feature vectors of the image and the text are mapped to a same specified semantic space, a distance between the feature vectors is calculated. For example, in FIG. 4, $S_1^1$, $S_1^2$, $S_1^3$, $S_1^4$, and $S_m$ represent feature vectors of a text, and $I_1$ and $I_n$ represent feature vectors of an image. In the specified semantic space, a distance between the image and the text is calculated. If the feature vectors used are feature vectors for representing global features, a calculation result is a similarity between the global features. If the feature vectors used are feature vectors for representing local features, a calculation result is a similarity between the local features.

2) With regard to extraction of a global representation (global feature) and a local representation (local feature) of an image sample.

Extracting a global feature of an image is not limited in this embodiment of this application. For example, a global representation of an image is represented by using a feature of a fully connected layer of a convolutional neural network of the image, for example, the foregoing CNN. The CNN herein may be selected from, but is not limited to, a Very Deep Convolutional Networks for Large-Scale Image Recognition (VGG), a Residual Network (ResNet), Inception, Inception V3, and Inception V4. Certainly, network models, such as Fully Convolutional Networks (FCNs) for Semantic Segmentation, may alternatively be used to extract a global representation of an image.

Herein, extracting a global representation of the image sample provided in this embodiment of this application is described, and may be specifically executed as follows: dividing the image sample into a specified quantity of image blocks, and for each image block, calculating a probability that the image block includes a specified category of image information; and selecting maximum probabilities of respective specified categories of image information in the specified quantity of image blocks, the maximum probabilities of the respective specified categories of image information constituting the local feature of the image sample.

Figure 5:
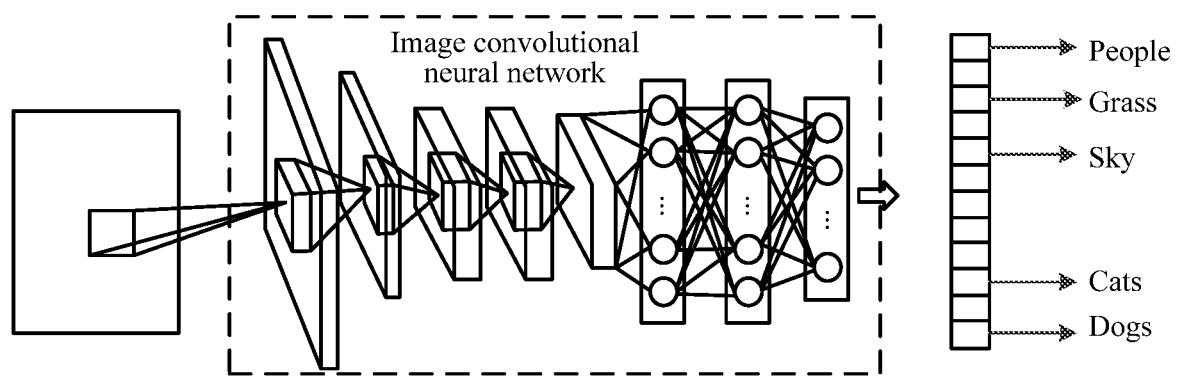
FIG. 5 is a schematic diagram of a category of image information according to some embodiments of this application.

For example, as shown in FIG. 5, an image CNN in FIG. 5 represents extracting a feature of an image block by using the image CNN. This application focuses on that for a given image, after the image is divided into blocks, features of respective image blocks are extracted. It is that assumed that there are five categories of image information in total, namely, people, grass, sky, dogs, and cats. Assuming that there are four image blocks for extraction, for each image block, a probability that the image block includes the foregoing five categories of image information. Then, for each category, a maximum probability is selected from the probabilities of the category of four image blocks. Maximum probabilities of the respective categories constitute the local feature of the image sample.

In one embodiment, alternatively, for each category, a maximum probability of the category may be compared with a corresponding probability threshold, to determine whether at least one image block in the sample image includes image information of the category. For example, for the category of people, a maximum probability is 0.99 in four image blocks, and a corresponding probability threshold is 0.8, indicating that at least one of the four image blocks includes a person.

3) With regard to extraction of a global representation (global feature) and a local representation (local feature) of a text sample.

In one embodiment, to better extract a global representation in a text sample, the following operations are included: performing word segmentation on the text sample; for each word segment, determining a vector of the word segment, different word segments having a same vector length; and inputting vectors of word segments of a same text sample into a convolutional neural network used to extract the global feature of the text sample, the neural network used to extract the global feature of the text sample including a plurality of convolutional layers and a pooling layer connected after the plurality of convolutional layers, and a field of view of a specified size of a previous convolutional layer being used as input of a current convolutional layer, the field of view of a specified size including features of at least two word segment vectors extracted by the previous convolutional layer.

For example, during a specific implementation, a convolutional operation of a convolutional layer may be represented by using the following formula (5):

$$V_{(l,f)}^i = \sigma(W_{l,f} \tilde{v}_{l-1}^i + b_{(l,f)}) \quad (5)$$

where $\tilde{v}_{l-1}^i = v_{l-1}^i \| v_{l-1}^{i+1} \ldots \| v_{l-1}^{i+r-1}$.

In the formula (5), r represents a field of view of a specified size; l−1 represents the $(l-1)^{th}$ convolutional layer (that is, a previous convolutional layer); l represents the $l^{th}$ convolutional layer (that is, a current convolutional layer); $W_{l,f}$ represents a product matrix; f represents the $f^{th}$ feature; i represents the $i^{th}$ location information; and $V_{(l,f)}^i$ represents an $f^{th}$ feature that corresponds to an ith location and that is extracted from the $l^{th}$ convolutional layer.

An operation of the pooling layer may be represented by the following formula (6):

$$v_{(l+1,f)}^i = \max(v_{(l,f)}^{M \times i}, v_{(l,f)}^{M \times i+1}, \ldots, v_{(l,f)}^{M \times i+M-1}) \quad (6)$$

where $v_{(l+1,f)}^i$ represents output of the pooling layer; l+1 represents the pooling layer; $v_{(l,f)}^{M \times i}$ represents the $(M \times i)^{th}$ feature extracted from the $l^{th}$ layer; and M represents a constant used to control a size of a pooling operation.

Figure 6:
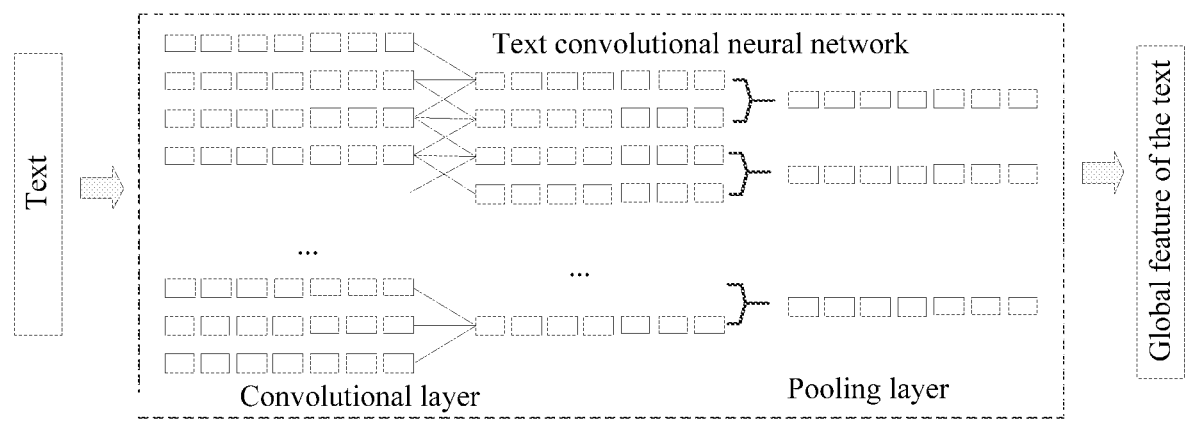
FIG. 6 is a block diagram of extracting a global representation of a text according to some embodiments of this application.

For example, as shown in FIG. 6, an inputted text is "a young child run through a large field of grass", a text global representation is extracted through a text convolutional neural network (that is, the sentence CNN in the figure). Specifically, the sentence CNN includes a plurality of convolutional layers to extract features of the text. Then, a max-pooling layer is used to perform integration and dimension reduction on the features extracted by the convolutional layer to obtain a global representation of the text.

Accordingly, in this embodiment of this application features of a text sample are extracted through a plurality of convolutional layers, and then, useless feature information is filtered through a pooling layer. Moreover, when a convolution operation is performed by using a plurality of convolutional layers, a field of view of a specified size is used, and since the field of view includes features of a plurality of word segments, it is equivalent to learning organization and interaction information between adjacent word segments in implementing a global representation of a text sample, so that a finally extracted global representation is more appropriate and accurate.

In one embodiment, a word2vec tool may be used to represent each word segment with a vector of a fixed length.

In addition, a neural network used to extract a global representation of a text may be a convolutional neural network or a recurrent neural network (RNN).

A local representation of the text sample may be extracted by using various methods, and can be more focused on each word segment. For example, a conventional term frequency—inverse document frequency (TF-IDF) representation may be used, or the Fisher vector acts on a vector of each word segment or an average value of vectors of word segments. Such a representation is more focused on a word segment rather than considering relevance between each word segment and another word segment, and therefore, may be considered as a local representation of the text.

The image-text bi-directional search method based on the foregoing matching model in the embodiments of this application is described below.

Figure 7:
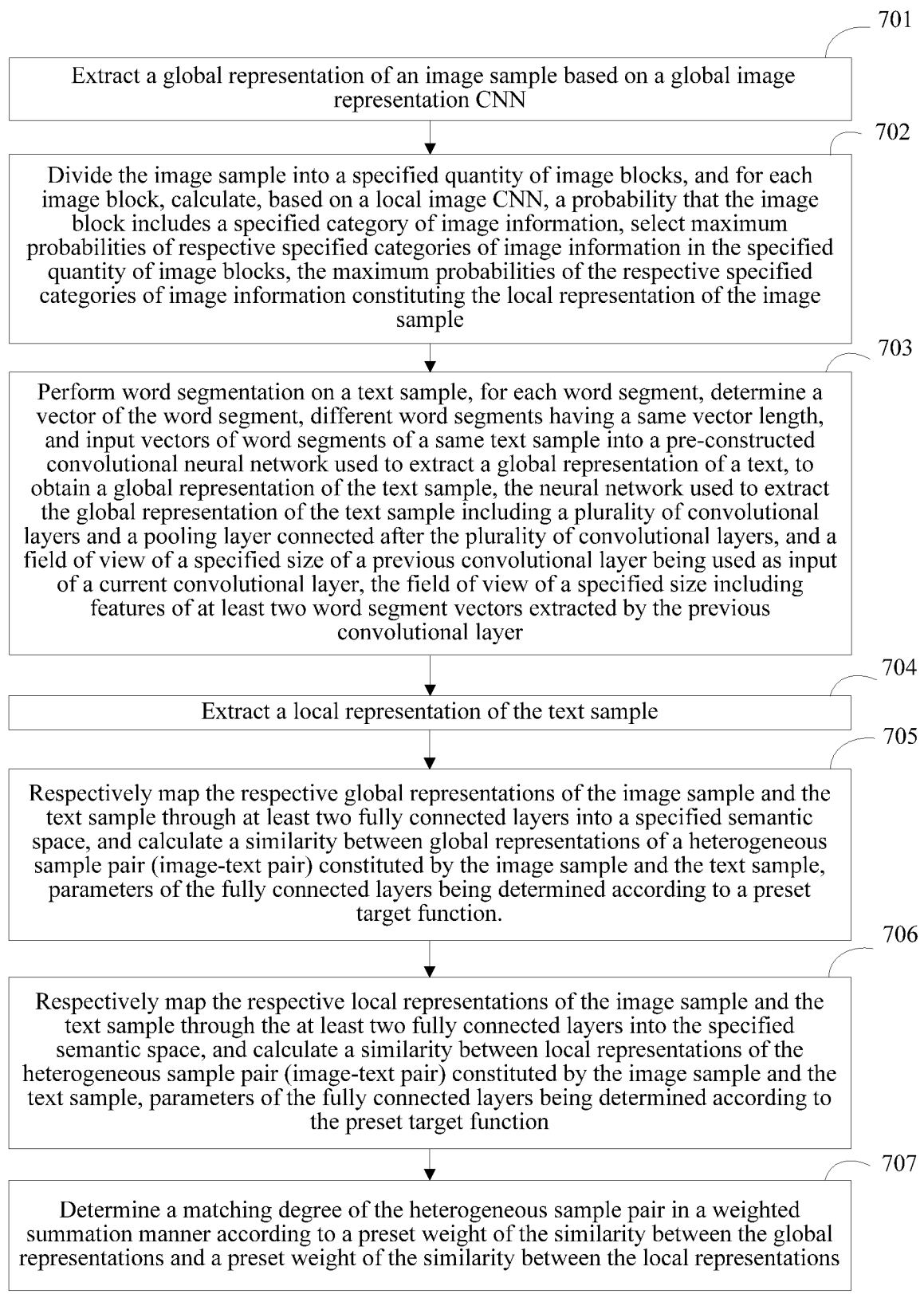
FIG. 7 is a schematic flowchart of a training method of an image-text matching model according to some embodiments of this application.

As shown in FIG. 7, which is a schematic flowchart of a specific embodiment of a training method of an image-text matching model according to an embodiment of this application, the method includes the following steps:

Step 701: Extract a global representation of an image sample based on a global image representation CNN.

Step 702: Divide the image sample into a specified quantity of image blocks, and for each image block, calculate, based on a local image CNN, a probability that the image block includes a specified category of image information, select maximum probabilities of respective specified categories of image information in the specified quantity of image blocks, the maximum probabilities of the respective specified categories of image information constituting the local representation of the image sample.

Step 703: Perform word segmentation on a text sample, for each word segment, determine a vector of the word segment, different word segments having a same vector length, and input vectors of word segments of a same text sample into a pre-constructed convolutional neural network used to extract a global representation of a text, to obtain a global representation of the text sample, the neural network used to extract the global representation of the text sample including a plurality of convolutional layers and a pooling layer connected after the plurality of convolutional layers, and a field of view of a specified size of a previous convolutional layer being used as input of a current convolutional layer, the field of view of a specified size including features of at least two word segment vectors extracted by the previous convolutional layer.

Step 704: Extract a local representation of the text sample.

An execution sequence of steps 701 to 704 is not limited.

Step 705: Respectively map the respective global representations of the image sample and the text sample through at least two fully connected layers into a specified semantic space, and calculate a similarity between global representations of a heterogeneous sample pair (image-text pair) constituted by the image sample and the text sample, parameters of the fully connected layers being determined according to a preset target function.

Step 706: Respectively map the respective local representations of the image sample and the text sample through the at least two fully connected layers into the specified semantic space, and calculate a similarity between local representations of the heterogeneous sample pair (image-text pair) constituted by the image sample and the text sample, parameters of the fully connected layers being determined according to the preset target function.

The execution sequence of steps 705 and 706 is not limited to what is described in the above embodiments.

In addition, the preset target function has been described in the foregoing embodiments, and details are not described herein again.

Step 707: Determine a matching degree of the heterogeneous sample pair in a weighted summation manner according to a preset weight of the similarity between the global representations and a preset weight of the similarity between the local representations.

In this embodiment of the present application, the local representation of the image is extracted through image blocks, and the global representation of the text is extracted by using a plurality of convolutional layers and a pooling layer, so that an association relationship between word segments of the text can be obtained, and the extracted features are more accurate and comprehensive. Then, the preset target function is used to make a similarity of a semantically associated heterogeneous sample pair higher than a similarity of a non-semantically associated heterogeneous sample pair and a similarity between image sample associated with a same image sample higher than a similarity between image sample associated with different image samples, so that calculation of a final similarity satisfies actual requirements better, so as to improve accuracy of matching between image and text.

Figure 8:
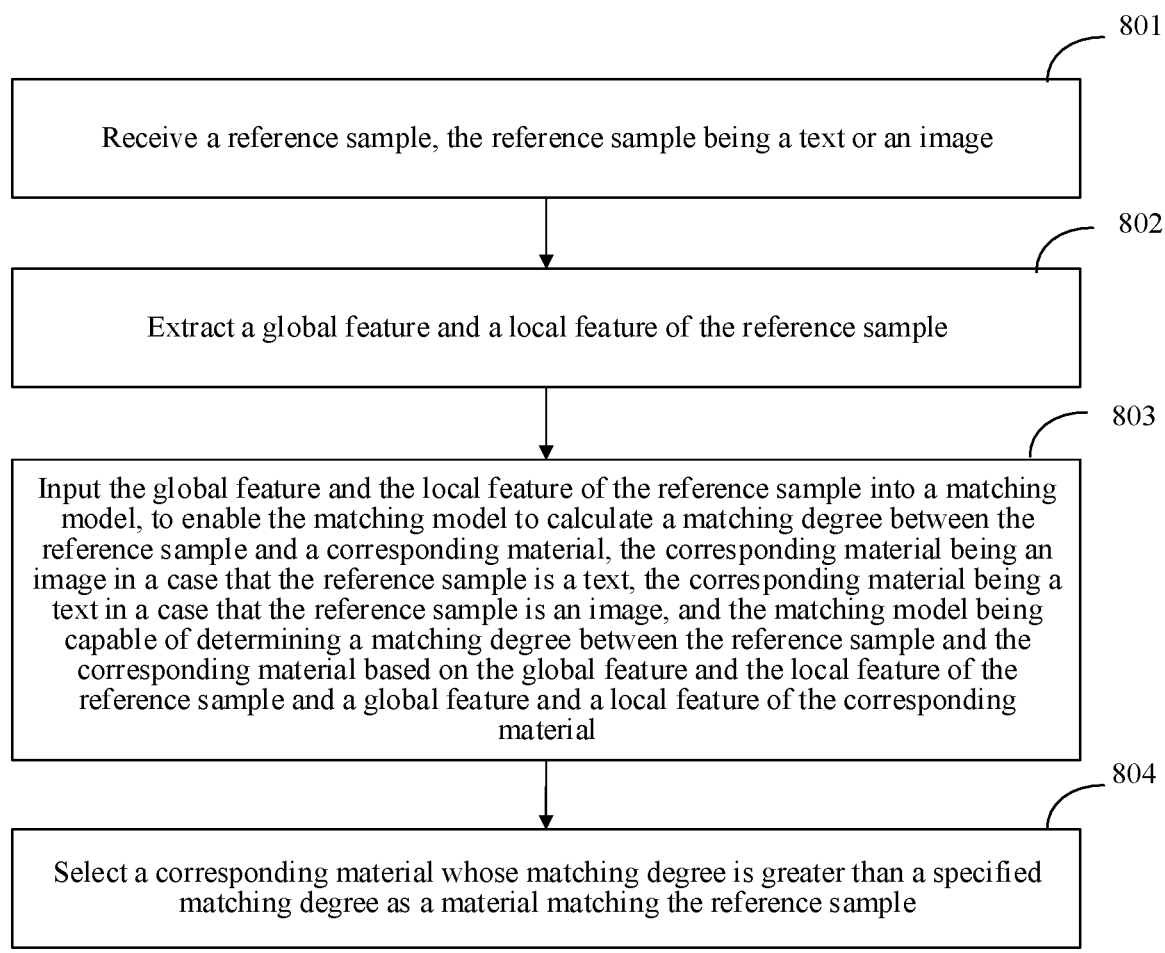
FIG. 8 is a schematic flowchart of an image-text bi-directional search method according to some embodiments of this application.

As shown in FIG. 8, which is a schematic flowchart of an image-text bi-directional search method according to some embodiments of this application, the method is performed by a computer, the computer may be a server 12, and the method includes the following steps:

Step 801: Receive a reference sample, the reference sample being a text or an image.

Step 802: Extract a global feature and a local feature of the reference sample.

Step 803: Input the global feature and the local feature of the reference sample into a matching model, to enable the matching model to calculate a matching degree between the reference sample and a corresponding material, the corresponding material being an image in a case that the reference sample is a text, the corresponding material being a text in a case that the reference sample is an image, and the matching model being capable of determining a matching degree between the reference sample and the corresponding material based on the global feature and the local feature of the reference sample and a global feature and a local feature of the corresponding material.

A material library may be established to calculate matching degrees between a reference sample and various corresponding materials in the material library. A specific method for calculating a matching degree has been described in the foregoing embodiments. Details are not described herein again.

Step 804: Select a corresponding material whose matching degree is greater than a specified matching degree as a material matching the reference sample.

This embodiment of this application implements searching for a corresponding material of a reference sample based on a matching model of a global representation and a local representation, so that a finally obtained matching result is more accurate. For example, an image matching a text is searched for or a question matching an image is searched for.

Based on an inventive concept the same as that in the foregoing embodiments, this embodiment of this application further provides a training apparatus of an image-text matching model. The principle and the beneficial effects of the apparatus are similar to the content in the foregoing method embodiment. Details are not described herein again.

Figure 9:
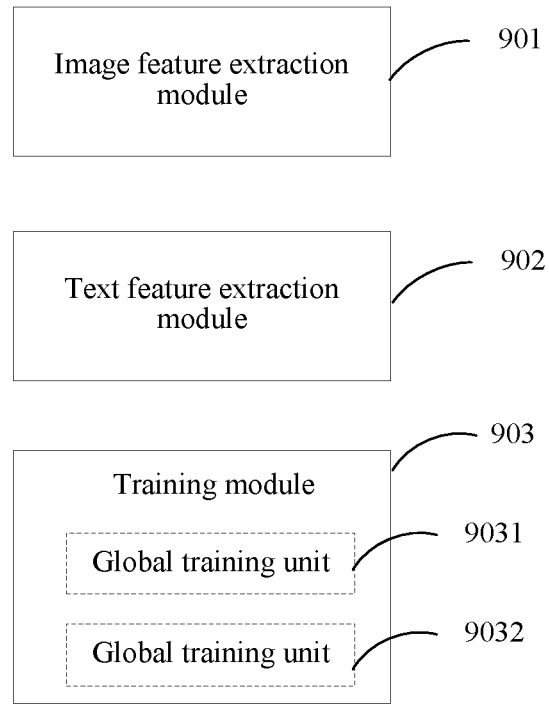
FIG. 9 is a schematic structural diagram of a training apparatus of an image-text matching model according to some embodiments of this application.

FIG. 9 is a schematic structural diagram of the apparatus. The apparatus includes: an image feature extraction module 901, configured to extract a global feature and a local feature of an image sample; a text feature extraction module 902, configured to extract a global feature and a local feature of a text sample; and a training module 903, configured to train a matching model according to the extracted global feature and local feature of the image sample and the extracted global feature and local feature of the text sample, to determine model parameters of the matching model, the matching model being used to determine, according to a global feature and a local feature of an inputted image and a global feature and a local feature of an inputted text, a matching degree between the image and the text.

In some embodiments, the respective global features of the image and the text are mapped through the matching model into a specified semantic space, to calculate a similarity between the global features of the image and the text; the respective local features of the image and the text are mapped into the specified semantic space, to calculate a similarity between the local features of the image and the text; and the matching degree between the image and the text is determined in a weighted summation manner according to a preset weight of the similarity between the global features and a preset weight of the similarity between the local features.

In some embodiments, the matching model includes at least two fully connected layers, and the model parameters of the matching model include parameters of the at least two fully connected layers.

The training module 903 specifically includes: a global training unit 9031, configured to map the respective global features of the image sample and the text sample through the at least two fully connected layers into the specified semantic space; and a local training unit 9032, configured to map the respective local features of the image sample and the text sample through the at least two fully connected layers into the specified semantic space.

The parameters of the at least two fully connected layers are determined according to mapping results and a preset target function, the preset target function being used to implement that a similarity of a semantically associated image-text pair is higher than a similarity of a non-semantically associated image-text pair; or the preset target function being used to implement that a similarity of a semantically associated image-text pair is higher than a similarity of a non-semantically associated image-text pair, and that a similarity between text samples associated with a same image sample is higher than a similarity between text samples associated with different image samples.

In some embodiments, the preset target function is used to implement that a similarity of a semantically associated image-text pair is higher than a similarity of a non-semantically associated image-text pair; the mapping results include: a global feature and a local feature of the image sample represented by the parameters of the at least two fully connected layers, and a global feature and a local feature of the text sample represented by the parameters of the at least two fully connected layers.

The training module 903 is configured to: determine a similarity of a semantically associated image-text pair represented by the parameters of the at least two fully connected layers and a similarity of a non-semantically associated image-text pair represented by the parameters of the at least two fully connected layers according to the global feature and the local feature of the image sample represented by the parameters of the at least two fully connected layers, and the global feature and the local feature of the text sample represented by the parameters of the at least two fully connected layers; and input the similarity of the semantically associated image-text pair represented by the parameters of the at least two fully connected layers and the similarity of the non-semantically associated image-text pair represented by the parameters of the at least two fully connected layers into the preset target function, to determine the parameters of the at least two fully connected layers.

If the preset target function is used to realize that a similarity of a semantically associated heterogeneous sample pair is higher than a similarity of a non-semantically associated heterogeneous sample pair, the preset target function may be:

$$L(I_n^+, S_n^+, I_n^-, S_n^-) = \lambda_1 \max(0, u_1 + d(I_n^+, S_n^+) - d(I_n^+, S_n^-)) + \lambda_2 \max(0, u_2 + d(I_n^+, S_n^+) - d(I_n^-, S_n^+)), \text{ where}$$

$L(I_n^+, S_n^+, I_n^-, S_n^-)$ represents a preset target function; $I_n^+, I_n^-$ represent a text sample; $S_n^+, S_n^-$ represent an image sample; in a case that a similarity between global representations is determined, $d(\ )$ represents a similarity between global representations of the text sample and the image sample; in a case that a similarity between local representations is determined, $d(\ )$ represents a similarity between local representations of the text sample and the image sample; $\lambda_1$ and $\lambda_2$ both represent preset coefficients; $d(I_n^+, S_n^+)$ represents a similarity of a semantically associated heterogeneous pair; $d(I_n^+, S_n^-)$ and $d(I_n^-, S_n^+)$ both represent a similarity of a non-semantically associated heterogeneous pair; and $\mu_1$ and $\mu_2$ both represent preset thresholds.

In some embodiments, the preset target function is used to implement that a similarity of a semantically associated image-text pair is higher than a similarity of a non-semantically associated image-text pair, and that a similarity between text samples associated with a same image sample is higher than a similarity between text samples associated with different image samples.

The mapping results include: a global feature and a local feature of the image sample represented by the parameters of the at least two fully connected layers, and a global feature and a local feature of the text sample represented by the parameters of the at least two fully connected layers.

The training module 903 is configured to: determine a similarity of a semantically associated image-text pair represented by the parameters of the at least two fully connected layers, a similarity of a non-semantically associated image-text pair represented by the parameters of the at least two fully connected layers, a similarity between text samples associated with a same image sample represented by the parameters of the at least two fully connected layers, and a similarity between text samples associated with different image samples represented by the parameters of the at least two fully connected layers according to the global feature and the local feature of the image sample represented by the parameters of the at least two fully connected layers, and the global feature and the local feature of the text sample represented by the parameters of the at least two fully connected layers; and input the similarity of the semantically associated image-text pair represented by the parameters of the at least two fully connected layers, the similarity of the non-semantically associated image-text pair represented by the parameters of the at least two fully connected layers, the similarity between text samples associated with the same image sample represented by the parameters of the at least two fully connected layers, and the similarity between text samples associated with different image samples represented by the parameters of the at least two fully connected layers into the preset target function, to determine the parameters of the at least two fully connected layers.

In some embodiments, the preset target function is determined through one of the following:

$$LY = L(I_n^+, S_n^+, I_n^-, S_n^-) + L(S_i, S_l, S_j); \text{ and}$$

$$LY = L(I_n^+, S_n^+, I_n^-, S_n^-) * L(S_i, S_l, S_j)$$

where $L(I_n^+, S_n^+, I_n^-, S_n^-) = \lambda_1 \max(0, u_1 + d(I_n^+, S_n^+) - d(I_n^+, S_n^-)) + \lambda_2 \max(0, u_2 + d(I_n^+, S_n^+) - d(I_n^-, S_n^+))$, where LY is a preset target function, $L(I_n^+, S_n^+, I_n^-, S_n^-)$ represents a relationship between a similarity of a semantically associated image-text pair and a similarity of a non-semantically associated image-text pair, and $L(S_i, S_l, S_j)$ represents a relationship between a similarity between text samples associated with a same image sample and a similarity between text samples associated with different image samples; $I_n^+, I_n^-$ represent a text sample; $S_n^+, S_n^-$ represent an image sample; in a case that a similarity between global features is determined, $d(\ )$ represents a similarity between global features of the text sample and the image sample; in a case that a similarity between local features is determined, $d(\ )$ represents similarity between local features of the text sample and the image sample; $\lambda_1$ and $\lambda_2$ both represent preset coefficients; $d(I_n^+, S_n^+)$ represents a similarity of a semantically associated heterogeneous pair (image-text pair); $d(I_n^+, S_n^-)$ and $d(I_n^-, S_n^+)$ both represent a similarity of a non-semantically associated heterogeneous pair (image-text pair); and $u_1$ and $u_2$ both represent preset thresholds, where $$L(S_i, S_l, S_j) = \max(0, u_3 + d(S_i, S_l) - d(S_i, S_j)), \text{ where}$$

$S_i, S_l$ represent text samples semantically associated with a same image sample; $S_i, S_j$ represent text samples associated with different image samples; in a case that a similarity between global features is determined, $d(\ )$ represents a similarity between global features of the text samples; in a case that a similarity between local features is determined, $d(\ )$ represents a similarity between local features of the text samples; and $u_3$ represents a preset threshold.

In some embodiments, the image feature extraction module is specifically configured to divide the image sample into a specified quantity of image blocks, and for each image block, calculate a probability that the image block includes a specified category of image information; and select maximum probabilities of respective specified categories of image information in the specified quantity of image blocks, the maximum probabilities of the respective specified categories of image information constituting the local feature of the image sample.

In some embodiments, the image feature extraction module is specifically configured to perform word segmentation on a text sample; for each word segment, determine a vector of the word segment, different word segments having a same vector length, and input vectors of word segments of a same text sample into a convolutional neural network used to extract the global feature of the text sample, the neural network used to extract the global feature of the text sample including a plurality of convolutional layers and a pooling layer connected after the plurality of convolutional layers, and a field of view of a specified size of a previous convolutional layer being used as input of a current convolutional layer, the field of view of a specified size including features of at least two word segment vectors extracted by the previous convolutional layer.

Based on an inventive concept the same as that in the foregoing embodiments, this embodiment of this application further provides an image-text bi-directional search apparatus. The principle and the beneficial effects of the apparatus are similar to the content in the foregoing method embodiment. Details are not described herein again.

Figure 10:
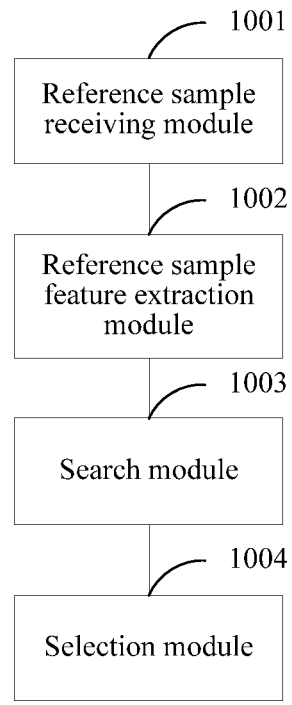
FIG. 10 is a schematic structural diagram of an image-text bi-directional search apparatus according to some embodiments of this application.

As shown in FIG. 10, which is a schematic structural diagram of the apparatus, the apparatus includes: a reference sample receiving module 1001, configured to receive a reference sample, the reference sample being a text or an image; a reference sample feature extraction module 1002, configured to extract a global feature and a local feature of the reference sample; a search module 1003, configured to input the global feature and the local feature of the reference sample into a matching model, to enable the matching model to calculate a matching degree between the reference sample and a corresponding material, the corresponding material being an image in a case that the reference sample is a text; the corresponding material being a text in a case that the reference sample is an image; and the matching model being capable of determining a matching degree between the reference sample and the corresponding material based on the global feature and the local feature of the reference sample and a global feature and a local feature of the corresponding material; and a selection module 1004, configured to select a corresponding material whose matching degree is greater than a specified matching degree as a material matching the reference sample.

Figure 11:
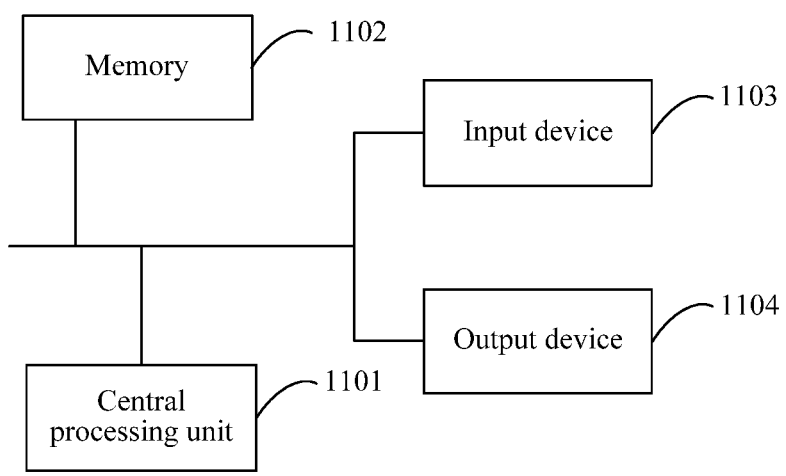
FIG. 11 is a schematic structural diagram of a computer device according to some embodiments of this application.

This embodiment of this application further provides a computing device. The computing device may be specifically a desktop computer, a portable computer, a smartphone, a tablet computer, a personal digital assistant (PDA), or the like. As shown in FIG. 11, the computing device may include a central processing unit (CPU) 1101, a memory 1102, an input device 1103, an output device 1104, and the like. The input device may include a keyboard, a mouse, a touchscreen, and the like. The output device may include a display device such as a liquid crystal display (LCD) or a cathode ray tube (CRT).

The memory may include a read-only memory (ROM) and a random access memory (RAM), and provides a program instruction and data stored in the memory to a processor. In this embodiment of this application, the memory may be configured to store program instructions of a training method of an image-text matching model and/or an image-text bi-directional search method. The processor obtains the program instructions stored in the memory, and the processor is configured to perform the following operations according to the obtained program instructions: extracting a global feature and a local feature of an image sample; extracting a global feature and a local feature of a text sample; and training a matching model according to the extracted global feature and local feature of the image sample and the extracted global feature and local feature of the text sample, to determine model parameters of the matching model, the matching model being used to determine, according to a global feature and a local feature of an inputted image and a global feature and a local feature of an inputted text, a matching degree between the image and the text.

Alternatively, the processor obtains the program instructions stored in the memory, and the processor is configured to perform the following operations according to the obtained program instructions: receiving a reference sample, the reference sample being a text or an image; extracting a global feature and a local feature of the reference sample; inputting the global feature and the local feature of the reference sample into a matching model, to enable the matching model to calculate a matching degree between the reference sample and a corresponding material, the corresponding material being an image in a case that the reference sample is a text; the corresponding material being a text in a case that the reference sample is an image; and the matching model being capable of determining a matching degree between the reference sample and the corresponding material based on the global feature and the local feature of the reference sample and a global feature and a local feature of the corresponding material; and selecting a corresponding material whose matching degree is greater than a specified matching degree as a material matching the reference sample.

This application provides a computer storage medium for storing computer program instructions used by the foregoing computing device, and including a program for performing the foregoing training method of an image-text matching model and/or the foregoing image-text bi-directional search method.

The computer storage medium may be any available medium or data storage device accessible by a computer, including, but not limited to, a magnetic memory (for example, a floppy disk, a hard disk, a magnetic tape, and a magneto-optical disk (MO)), an optical memory (for example, a CD, a DVD, a BD, and an HVD), a semiconductor memory (for example, a ROM, an EPROM, an EEPROM, a non-volatile memory (NAND FLASH), and a solid state drive (SSD)), and the like.

Finally, the above embodiments are merely provided for describing the technical solutions of this application, but not intended to limit this application. It is to be understood by a person of ordinary skill in the art that although this application has been described in detail with reference to the foregoing embodiments, modifications can be made to the technical solutions described in the foregoing embodiments, or equivalent replacements can be made to some technical features in the technical solutions, as long as such modifications or replacements do not cause the essence of corresponding technical solutions to depart from the spirit and scope of this application.

What is claimed is:

1. A training method of an image-text matching model, the method being performed by a computing device and comprising:

extracting a global feature and a local feature of an image sample;

extracting a global feature and a local feature of a text sample;

training a matching model according to the extracted global feature and local feature of the image sample and the extracted global feature and local feature of the text sample, to determine model parameters of the matching model; and determining, by the matching model, according to a global feature and a local feature of an inputted image and a global feature and a local feature of an inputted text, a matching degree between the image and the text.

2. The method according to claim 1, further comprising:

mapping the respective global features of the image and the text through the matching model into a specified semantic space, to calculate a similarity between the global features of the image and the text;

mapping the respective local features of the image and the text into the specified semantic space, to calculate a similarity between the local features of the image and the text; and determining the matching degree between the image and the text according to a weight of the similarity between the global features and a weight of the similarity between the local features.

3. The method according to claim 1, wherein the matching model comprises at least two connected layers, and the model parameters of the matching model comprise parameters of the at least two connected layers; and the training a matching model according to the extracted global feature and local feature of the image sample and the extracted global feature and local feature of the text sample, to determine model parameters of the matching model comprises: mapping the respective global features of the image sample and the text sample through the at least two connected layers into the specified semantic space; mapping the respective local features of the image sample and the text sample through the at least two connected layers into the specified semantic space; and determining the parameters of the at least two connected layers according to mapping results and a target function, the target function being that a similarity of a semantically associated image-text pair is higher than a similarity of a non-semantically associated image-text pair, or the target function determining a similarity of a semantically associated image-text pair is higher than a similarity of a non-semantically associated image-text pair, and that a similarity between text samples associated with a same image sample is higher than a similarity between text samples associated with different image samples.

4. The method according to claim 3, wherein the target function determining a similarity of a semantically associated image-text pair is higher than a similarity of a non-semantically associated image-text pair;

the mapping results comprise: a global feature and a local feature of the image sample represented by the parameters of the at least two connected layers, and a global feature and a local feature of the text sample represented by the parameters of the at least two connected layers; and the determining the parameters of the at least two connected layers according to mapping results and a target function comprises:

determining a similarity of a semantically associated image-text pair represented by the parameters of the at least two connected layers and a similarity of a non-semantically associated image-text pair represented by the parameters of the at least two connected layers according to the global feature and the local feature of the image sample represented by the parameters of the at least two connected layers, and the global feature and the local feature of the text sample represented by the parameters of the at least two connected layers; and inputting the similarity of the semantically associated image-text pair represented by the parameters of the at least two connected layers and the similarity of the non-semantically associated image-text pair represented by the parameters of the at least two connected layers into the target function, to determine the parameters of the at least two connected layers.

5. The method according to claim 3, wherein the target function determining a similarity of a semantically associated image-text pair is higher than a similarity of a non-semantically associated image-text pair, and that a similarity between text samples associated with a same image sample is higher than a similarity between text samples associated with different image samples;

the mapping results comprise: a global feature and a local feature of the image sample represented by the parameters of the at least two connected layers, and a global feature and a local feature of the text sample represented by the parameters of the at least two connected layers; and the determining the parameters of the at least two connected layers according to mapping results and a target function comprises:

determining a similarity of a semantically associated image-text pair represented by the parameters of the at least two connected layers, a similarity of a non-semantically associated image-text pair represented by the parameters of the at least two connected layers, a similarity between text samples associated with a same image sample represented by the parameters of the at least two connected layers, and a similarity between text samples associated with different image samples represented by the parameters of the at least two connected layers according to the global feature and the local feature of the image sample represented by the parameters of the at least two connected layers, and the global feature and the local feature of the text sample represented by the parameters of the at least two connected layers; and inputting the similarity of the semantically associated image-text pair represented by the parameters of the at least two connected layers, the similarity of the non-semantically associated image-text pair represented by the parameters of the at least two connected layers, the similarity between text samples associated with the same image sample represented by the parameters of the at least two connected layers, and the similarity between text samples associated with different image samples represented by the parameters of the at least two connected layers into the target function, to determine the parameters of the at least two connected layers.

6. The method according to claim 1, wherein the extracting a local feature of an image sample comprises:

dividing the image sample into a specified quantity of image blocks, and for each image block, calculating a probability that the image block comprises a specified category of image information; and selecting maximum probabilities of respective specified categories of image information in the specified quantity of image blocks, the maximum probabilities of the respective specified categories of image information constituting the local feature of the image sample.

7. The method according to claim 1, wherein the extracting a global feature of a text sample comprises:
   performing word segmentation on the text sample;
   for each word segment, determining a vector of the word segment, different word segments having a same vector length; and
   inputting vectors of word segments of a same text sample into a convolutional neural network used to extract the global feature of the text sample, the neural network used to extract the global feature of the text sample comprising a plurality of convolutional layers and a pooling layer connected after the plurality of convolutional layers, and a field of view of a specified size of a previous convolutional layer being used as input of a current convolutional layer, the field of view of a specified size comprising features of at least two word segment vectors extracted by the previous convolutional layer.

8. An image-text bi-directional search method, the method being performed by a computing device and comprising:
   receiving a reference sample, the reference sample being a text or an image;
   extracting a global feature and a local feature of the reference sample;
   inputting the global feature and the local feature of the reference sample into a matching model, to enable the matching model to calculate a matching degree between the reference sample and a corresponding material, the corresponding material being an image when the reference sample is a text; the corresponding material being a text when the reference sample is an image; and the matching model being capable of determining a matching degree between the reference sample and the corresponding material based on the global feature and the local feature of the reference sample and a global feature and a local feature of the corresponding material; and
   selecting a corresponding material whose matching degree is greater than a specified matching degree as a material matching the reference sample.

9. The method according to claim 8, further comprising:
   mapping the respective global features of the reference sample and the corresponding material through the matching model into a specified semantic space, to calculate a similarity between the global features of the reference sample and the corresponding material;
   mapping the respective local features of the reference sample and the corresponding material into the specified semantic space, to calculate a similarity between the local features of the reference sample and the corresponding material; and
   determining the matching degree between the reference sample and the corresponding material according to a weight of the similarity between the global features and a weight of the similarity between the local features.

10. The method according to claim 8, wherein the extracting a local feature of a reference sample comprises:
    dividing an image sample into a specified quantity of image blocks, and for each image block, calculating a probability that the image block comprises a specified category of image information; and
    selecting maximum probabilities of respective specified categories of image information in the specified quantity of image blocks, the maximum probabilities of the respective specified categories of image information constituting the local feature of the image sample.

11. The method according to claim 8, wherein the extracting a global feature of a reference sample comprises:
    performing word segmentation on a text sample;
    for each word segment, determining a vector of the word segment, different word segments having a same vector length; and
    inputting vectors of word segments of a same text sample into a convolutional neural network used to extract the global feature of the text sample, the neural network used to extract the global feature of the text sample comprising a plurality of convolutional layers and a pooling layer connected after the plurality of convolutional layers, and a field of view of a specified size of a previous convolutional layer being used as input of a current convolutional layer, the field of view of a specified size comprising features of at least two word segment vectors extracted by the previous convolutional layer.

12. A non-transitory computer readable medium containing program instructions for training an image-text matching model, wherein execution of the program instructions by one or more processors of a computing system causes the one or more processors to perform the steps of:
    extracting a global feature and a local feature of an image sample;
    extracting a global feature and a local feature of a text sample;
    training a matching model according to the extracted global feature and local feature of the image sample and the extracted global feature and local feature of the text sample; and
    determining model parameters of the matching model, the matching model being used to determine, according to a global feature and a local feature of an image and a global feature and a local feature of a text, a matching degree between the image and the text.

13. The non-transitory computer readable medium according to claim 12, wherein the one or more processors further performs the steps of:
    mapping the respective global features of the image and the text through the matching model into a specified semantic space, to calculate a similarity between the global features of the image and the text;
    mapping the respective local features of the image and the text into the specified semantic space, to calculate a similarity between the local features of the image and the text; and
    determining the matching degree between the image and the text according to a weight of the similarity between the global features and a weight of the similarity between the local features.

14. The non-transitory computer readable medium according to claim 12, wherein the matching model comprises at least two connected layers, and the model parameters of the matching model comprise parameters of the at least two connected layers.

15. The non-transitory computer readable medium according to claim 12, wherein the training a matching model according to the extracted global feature and local feature of the image sample and the extracted global feature and local feature of the text sample, to determine model parameters of the matching model further comprises:

mapping the respective global features of the image sample and the text sample through the at least two connected layers into the specified semantic space; mapping the respective local features of the image sample and the text sample through the at least two connected layers into the specified semantic space; and
determining the parameters of the at least two connected layers according to mapping results and a target function, the target function being that a similarity of a semantically associated image-text pair is higher than a similarity of a non-semantically associated image-text pair, or
the target function being that a similarity of a semantically associated image-text pair is higher than a similarity of a non-semantically associated image-text pair, and that a similarity between text samples associated with a same image sample is higher than a similarity between text samples associated with different image samples.

16. The non-transitory computer readable medium according to claim 15, wherein the target function determines a similarity of a semantically associated image-text pair is higher than a similarity of a non-semantically associated image-text pair.

17. The non-transitory computer readable medium according to claim 16, wherein the mapping results comprise: a global feature and a local feature of the image sample represented by the parameters of the at least two connected layers, and a global feature and a local feature of the text sample represented by the parameters of the at least two connected layers.

18. The non-transitory computer readable medium according to claim 17, wherein the determining the parameters of the at least two connected layers according to mapping results and a target function comprises:
determining a similarity of a semantically associated image-text pair represented by the parameters of the at least two connected layers and a similarity of a non-semantically associated image-text pair represented by the parameters of the at least two connected layers according to the global feature and the local feature of the image sample represented by the parameters of the at least two connected layers, and the global feature and the local feature of the text sample represented by the parameters of the at least two connected layers; and
inputting the similarity of the semantically associated image-text pair represented by the parameters of the at least two connected layers and the similarity of the non-semantically associated image-text pair represented by the parameters of the at least two connected layers into the target function, to determine the parameters of the at least two connected layers.

* * * * *